J. CRANE.
TIRE.
APPLICATION FILED DEC. 24, 1919.
1,387,242.
Patented Aug. 9, 1921.
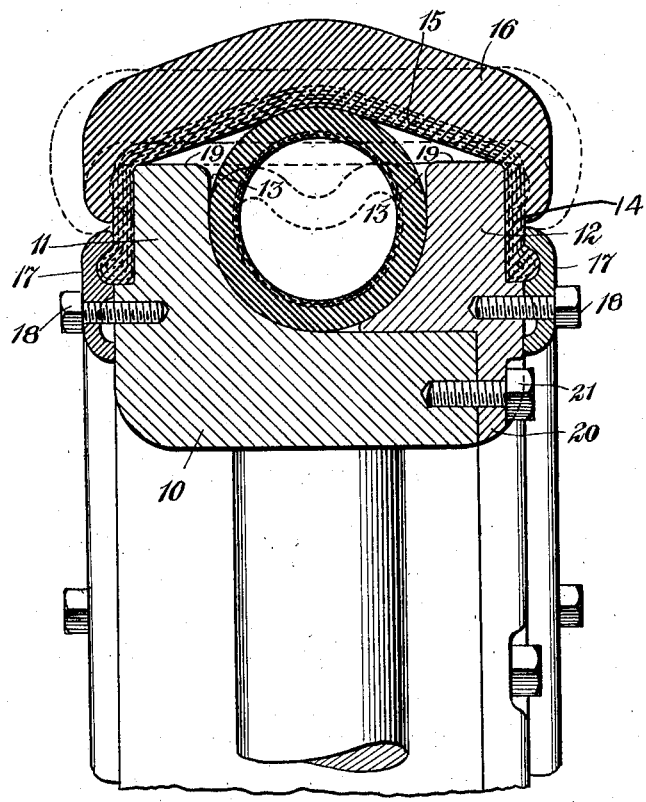
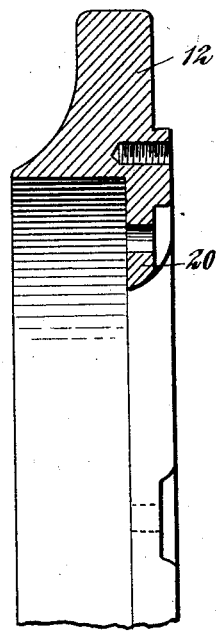
INVENTOR
Joshua Crane
BY
ATTORNEY

UNITED STATES PATENT OFFICE.

JOSHUA CRANE, OF WESTWOOD, MASSACHUSETTS.

TIRE.

1,387,242.    Specification of Letters Patent.    Patented Aug. 9, 1921.

Application filed December 24, 1919. Serial No. 347,115.

*To all whom it may concern:*

Be it known that I, JOSHUA CRANE, a citizen of the United States, and a resident of Westwood, in the county of Norfolk and State of Massachusetts, have invented certain new and useful Improvements in Tires, of which the following is a specification.

This invention relates to pneumatic tires for use on vehicles and more particularly to that type in which the air is retained by a flexible inner tube which is protected from wear or direct contact with the ground by a flexible outer casing or shoe. Tires of this general character now in use have recognized advantages but are open to very serious objection, due to the fact, that when the inner tube is punctured, blows out, or for any other reason loses its air pressure, the portions of the casing or shoe which come in contact with the rim are very rapidly cut or otherwise ruined if the vehicle continues to travel with the tire flat.

The main object of my invention is to so design the rim and outer casing or shoe that in normal use the weight of the vehicle will be sustained by the air pressure confined in the inner tube, but, in case this air escapes, the casing may engage with coacting parts of the rim to produce a very serviceable cushion tire which will not be injured and which will possess very serviceable and satisfactory riding qualities so that the vehicle may be driven for an indefinite distance with the inner tube deflated and without injury to the parts or total loss of the resilient load sustaining properties of the tire.

As an important feature of my invention I so form the side flange portions of the rim that an adequate diameter will be formed therebetween to receive the tube when deflated. I also so form them that they present spaced, comparatively broad, layer supporting surfaces with which comparatively thick cushion portions of the casing may engage and support the vehicle when the tire is deflated.

In the accompanying drawings I have illustrated one embodiment of my invention although it will be evident that various changes in construction, proportion and design of the parts may be made within the scope of the appended claim and without departing from the spirit of my invention.

In these drawings:

Figure 1 is a transverse section through a portion of a vehicle wheel showing the parts in normal position by solid lines and in deflated position by dotted lines; and Fig. 2 is a sectional detail of a removable section of the rim.

In the specific form illustrated the vehicle wheel has a rim 10 of the desired width which may be as wide as, or possibly slightly wider than the thickness of an ordinary tire. This rim has a pair of outwardly extending substantially parallel side flanges 11 and 12 spaced apart to leave a tube receiving chamber 13 therebetween. Within this chamber is an inner tube 14. This may have the usual valve stem projecting through the center of the rim for holding the tube against creeping and to permit of the inflation thereof. Instead of forming this inner tube of pure rubber or rubber composition which will permit it to stretch to completely fill the cavity, I form it with non-extensible fabric reinforcement so that when completely inflated it will assume substantially circular form of definite diameter as illustrated in solid lines in Fig. 1. This inner tube may be made up more nearly like a bicycle single tube tire than like the ordinary inner tube adapted for use with the separate casing. This inner tube of flexible inflatable but substantially non-extensible form is of such size and proportion that when inflated to the desired riding pressure will project out beyond the outer edges of the side flanges 11 and 12 to a considerable distance which should not be materially less than one-third the diameter of the tube.

The outer shoe or casing may be built up in substantially the same way as the ordinary outer casing, that is, it may be made up of reinforcing canvas or cord layers 15, and an outer comparatively thick rubber or rubber composition layer 16. The side edges of this casing or shoe may be secured to the flanges 11 and 12 of the rim in various different ways so as to firmly anchor them to permit them to withstand the pull resulting from the inflation of the inner tube and the creeping tendency when in use. Merely as an example of such securing means I have shown the fabric reinforcing layers 14 extending down along the outer face of the flanges 11 and 12 and securely clamped to said flanges by annular clamping plates 17 held by bolts or screws 18.

The outer surfaces 19 of the flanges 11 and 12 are substantially cylindrical and normally do not support or directly engage with any material portion of the inner surfaces of the casing. At the same time, these surfaces 19 are sufficiently broad so that when the inner tube is deflated and collapses into the chamber 13 the casing may lie directly across these surfaces as indicated in dotted lines in Fig. 1. The rubber composition 16 of the shoe may be of substantially the same thickness along the portions which pass over the surfaces 19 as along the center line of the tread. When the tire is inflated the main wear will come along the center of the tread and the weight of the vehicle will be sustained not only by the cushion effect of the center portion of the casing but also and effectively by the air pressure of the inner tube. When the tube is deflated, the tire will be supported by the cushion portions adjacent to the edges of the shoe with these portions resting upon the outer surfaces 19—19 of the flanges of the rim. As the tire wears, the cushion layer may become thinner along the center line than along the edges, as the wear adjacent to the edges will be comparatively slight. Thus even though the shoe has become very materially worn, a proper cushion effect will be produced and reasonably easy riding conditions maintained should the inner tube become deflated. The width of the casing between the opposite clamped edges is preferably such in respect to the diameter of the tube and the depth of the chamber 13 so that when the tire is new and the tube is inflated it will put a very material stretching tendency on the casing. As the tire becomes older and worn the inner tube may assume more nearly a cylindrical form inflated and thus properly support the casing.

To permit the inner tube to be properly placed in position the rim is preferably of separable sections. I do not wish to be limited to any particular way of forming or connecting these sections but, merely for the purpose of illustration, have shown the flange 12 as separate from the main body of the rim and having portions engaging with the outer surface and the side edge of the body of the latter. The depending portion 20 of the flange 12 may be secured to the body of the rim in any suitable manner as, for instance, by bolts 21. By detaching the casing from the flange 12 and detaching the flange from the body of the rim the flange and inner tube may be removed without disengaging the opposite side of the casing from the rim. Due to the thickness and general character of the outer casing and the reinforced character of the inner tube, there is little, if any, chance of puncturing the inner tube and the inner tube is protected from moisture, dirt and direct blows so that, if properly constructed, there is little liability of a blowout. Even though a nail should be driven through the casing in such a way that it would puncture the ordinary inner tube, it might not even touch the inner tube of my improved construction due to the fact that the tube and casing engage only along a limited area across the tread. Due to the fact that it is possible to drive comfortably and without injury to the tube or casing with the tube deflated, it will be evident that one can save the expense of such extra rims and tires as are now usually carried on automobiles.

Having thus described my invention what I claim as new and desire to secure by Letters Patent is:

A vehicle wheel, having a rim of substantially channel form in cross section with comparatively thick outwardly extending approximately parallel flanges, presenting comparatively wide cylindrical load supporting surfaces, an inflatable and substantially non-extensible tube within said channel and having a diameter, when inflated, greater than the depth of the channel, so as to project outward radially beyond said surfaces, and a casing of substantially channel shape in cross section, the flanges of said casing extending inward radially of the wheel and overlapping the flanges of said rim, and detachably secured to the outer surface of the latter, the web of said casing channel being of substantially uniform thickness through its width, and normally bowed outwardly from the outer edge of one of said surfaces to the opposite outer edge of the other surface, so as to be free of said surfaces when said tire is inflated and adapted to rest on said surfaces and directly transmit the weight of the load to said surface when said tube is deflated.

Signed at Boston in the county of Suffolk and State of Massachusetts this 19th day of December A. D. 1919.

JOSHUA CRANE.